United States Patent [19]

Pennington et al.

[11] 4,435,518

[45] Mar. 6, 1984

[54] POLYMERIZATION CATALYST

[75] Inventors: B. Timothy Pennington, Sulphur, La.; Paul V. Roling, Spring, Tex.; John T. T. Hsieh, Warren, N.J.

[73] Assignee: Cities Service Co., Tulsa, Okla.

[21] Appl. No.: 444,287

[22] Filed: Nov. 24, 1982

[51] Int. Cl.$^3$ .............................................. C08F 4/68
[52] U.S. Cl. .................................. 502/107; 502/111; 502/125; 526/124; 526/129; 526/142
[58] Field of Search ............... 252/429 B, 429 C, 428, 252/430

[56] References Cited

U.S. PATENT DOCUMENTS

| | | | |
|---|---|---|---|
| 3,457,244 | 7/1969 | Fukuda et al. | 526/142 |
| 3,535,269 | 10/1970 | Tanaka et al. | 252/429 B |
| 3,591,656 | 7/1971 | Kroll | 252/429 C X |
| 4,113,933 | 9/1978 | Schweier et al. | 252/429 C X |
| 4,148,754 | 4/1979 | Strobel et al. | 252/429 C |
| 4,263,171 | 4/1981 | Shida et al. | 252/429 C |
| 4,330,648 | 5/1982 | Welch | 252/429 B X |
| 4,333,851 | 6/1982 | Speakman et al. | 252/429 B |

FOREIGN PATENT DOCUMENTS 1175593 12/1969 United Kingdom.
1489410 10/1977 United Kingdom.

Primary Examiner—Patrick Garvin
Attorney, Agent, or Firm—Patricia J. Hogan

[57] ABSTRACT

Catalyst compositions which are particularly useful for the preparation of ethylene polymers having a narrow molecular weight distribution are obtained by (1) drying an inorganic oxide having surface hydroxyl groups, e.g., silica, alumina, magnesia, etc., to remove adsorbed water, (2) reacting the surface hydroxyl groups with at least a stoichiometric amount of an organometallic compound having at least one alkyl group attached to a Group III metal, e.g., a trialkylaluminum, (3) reacting the thus-treated inorganic oxide with a vanadium halide, such as (a) $VOCl_3$, $VOBr_3$, and/or mono-, di-, and/or trihydrocarbyloxy derivatives thereof and/or (b) $VCl_4$, $VBr_4$, and/or mono-, di-, tri-, and/or tetrahydrocarbyloxy derivatives thereof, and (4) reacting that reaction product with at least about 0.1 mol, per mol of organometallic compound, of an alcohol containing 1 to 18 carbon atoms.

22 Claims, No Drawings

POLYMERIZATION CATALYST

BACKGROUND OF THE INVENTION

1. Field of the Invention

This invention relates to the polymerization of olefins and more particularly relates to catalyst compositions useful for polymerizing one or more monomers comprising ethylene to polymers having a narrow molecular weight distribution and a good balance of physical properties.

2. Description of the Prior Art

It is known that catalysts of the type variously described as coordination, Ziegler, Ziegler-type, or Ziegler-Natta catalysts are useful for the polymerization of olefins under moderate conditions of temperature and pressure. It is also known that the properties of the polymers obtainable by the use of such catalysts, as well as the relative economies of the processes used to prepare the polymers, vary with several factors, including the choice of the particular monomers, catalyst components, polymerization adjuvants, and other polymerization conditions employed.

During the years since Ziegler catalysts were first publicly disclosed, there has been a considerable amount of research conducted on the use of such catalysts; and numerous publications have resulted from that research. These publications have added much to the knowledge of how to make various types of olefin polymers by various types of processes. However, as is apparent from the amount of research on Ziegler catalysis that is still being conducted throughout the world, as well as the number of patents that are still being issued to inventors working in the field of Ziegler catalysis, the means of attaining certain results when polymerizing olefins with Ziegler catalysts are still frequently unpredictable. The fact that this situation exists is sometimes due to the need to obtain a previously-unattainable combination of results; occasionally due to difficulties in obtaining the same results in a commercial-scale apparatus as in a laboratory-scale reactor; and often due to a polymerization parameter's having an effect, or side-effect, in a given type of polymerization process that is different from effects achieved by its use in prior art processes of a different type.

One aspect of Ziegler catalysis in which the need for further research has been found to exist has been in the field of preparing ethylene polymers having a narrow molecular weight distribution and a good balance of physical properties. Such polymers have particular application in the production of articles that are formed by injection molding; typically having molecular weight distributions such that their normalized $V_{30}/V_{300}$ melt viscosity ratios are in the range of about 1.5 to 2.3, with the ratios in the lower portion of this range being generally preferred but difficult to attain with known processes that might otherwise be commercially feasible; and—like other polymers intended for commercial use—are desirably prepared by a process which is as economical as possible as well as being capable of producing a polymer having the desired properties.

There are, of course, known processes for preparing injection molding resins by polymerizing ethylene with the aid of Ziegler catalysts. However, the known processes typically suffer one or more of the disadvantages of lack of economy, inability to produce polymers having a suitable balance of properties, and/or unreliability in producing such polymers—particularly in commercial-scale operations. What is still needed is a catalyst which (a) is suitable for use in a gas-phase polymerization process, (b) is capable of yielding polymers having a narrow molecular weight distribution and a good balance of physical properties, and (c) has sufficient activity to be economically attractive.

British Pat. No. 1,489,410 (Monsanto) teaches gas-phase polymerization processes which, because of their use of supported Ziegler catalysts having a vanadium component and other factors, are commercially attractive processes. However, as taught in the patent, the processes are designed to result in the formation of polymers having the broad molecular weight distributions suitable for blow molding resins rather than the narrower molecular weight distributions needed for injection molding resins; and the patent itself does not suggest how its processes might be modified to result in the formation of polymers having narrower molecular weight distributions. Attempts to make the processes of the patent suitable for the preparation of injection molding resins by combining its teachings with the teachings of publications that discuss means of narrowing molecular weight distribution have not been successful. For example, polymers having a sufficiently narrow molecular weight distribution have not been obtained when Monsanto's preferred vanadium halides have been replaced with the alkoxy group-containing vanadium compounds which are within the scope of their patent and which U.S. Pat. Nos. 3,457,244 (Fukuda et al.) and 3,655,583 (Yamamoto et al.) teach to result in the production of polymers having narrower molecular weight distributions when unsupported catalyst systems are employed.

Fukuda et al. also teach that ethylene copolymers or terpolymers having narrow molecular weight distributions can be obtained by the use of an unsupported catalyst composition prepared by (1) mixing an alcohol containing 1 to 12 carbon atoms with $VOCl_3$ and then (2) mixing the mixture thus obtained with an alkylaluminum compound in the presence of the monomers to be interpolymerized, and there are other patents, e.g., Stamicarbon's British Pat. No. 1,175,593 and U.S. Pat. Nos. 3,535,269 (Tanaka et al.), 4,071,674 (Kashiwa et al.), and 4,256,865 (Hyde et al.) which teach the use of catalyst compositions prepared by adding an alcohol at some stage during the catalyst preparation. However, although some of these patents are concerned with the production of polymers having narrow molecular weight distributions, none of them teaches a catalyst composition which satisfies the aforementioned need for a catalyst suitable for use in a commercially-attractive gas-phase polymerization process that is capable of producing injection molding-grade polymers having a good balance of physical properties.

SUMMARY OF THE INVENTION

An object of the invention is to provide novel catalyst compositions useful for the polymerization of olefins.

Another object is to provide such catalyst compositions useful in an economical gas-phase process for polymerizing one or more monomers comprising ethylene to polymers having a narrow-to-intermediate molecular weight distribution and a good balance of physical properties.

Still another object is to provide processes for preparing such catalyst compositions.

A further object is to provide olefin polymerization processes utilizing the novel catalyst compositions.

These and other objects are attained by:

(A) preparing a catalyst composition by:

(1) drying an inorganic oxide having surface hydroxyl groups to form a support that is substantially free of adsorbed water, (2) reacting the surface hydroxyl groups of the support with at least a substantially stoichiometric amount of at least one organometallic compound corresponding to the formula $R_xMR'_yR''_z$, wherein M is a metal of Group III of the periodic table, R is an alkyl group containing 1 to 12 carbon atoms, R' and R" are independently selected from the group consisting of H, Cl, and alkyl and alkoxy groups containing 1 to 12 carbon atoms, x has a value of 1 to 3, and y and z both represent values of 0 to 2, the sum is not greater than $3-x$, (3) reacting the thus-treated support with at least about 0.001 mol, per mol of organometallic compound, of at least one vanadium compound corresponding to a formula selected from $(RO)_nVOX_{3-n}$ and $(RO)_mVX_{4-m}$, in which formulas R represents a $C_1$-$C_{18}$ monovalent hydrocarbon radical that is free of aliphatic unsaturation, X is Cl or Br, n has a value of 0 to 3, and m has a value of 0 to 4, and (4) reacting the product of step 3 with at least about 0.1 mol, per mol of organometallic compound, of an alcohol containing 1 to 18 carbon atoms and (B) when desired, polymerizing a monomer charge comprising ethylene in contact with the catalyst composition thus prepared.

DETAILED DESCRIPTION

The inorganic oxide used in preparing a catalyst composition of the invention may be any particulate inorganic oxide or mixed oxide, e.g., silica, alumina, silica-alumina, magnesia, zirconia, thoria, titania, etc., having surface hydroxyl groups capable of reacting with the organometallic compound. However, it is generally an inorganic oxide selected from the group consisting of silica, alumina, magnesia, and mixtures thereof, i.e., physical mixtures, such as mixtures of silica and alumina particles, etc., and/or chemical mixtures, such as magnesium silicate, aluminum silicate, etc. The surface hydroxyl groups may be at the outer surfaces of the oxide particles or at the surfaces of pores in the particles, the only requirement in this regard being that they be available for reaction with the organometallic compound.

The specific particle size, surface area, pore volume, and number of surface hydroxyl groups characteristic of the inorganic oxide are not critical to its utility in the practice of the invention. However, since such characteristics determine the amount of inorganic oxide that it is desirable to employ in preparing the catalyst compositions, as well as sometimes affecting the properties of polymers formed with the aid of the catalyst compositions, these characteristics must frequently be taken into consideration in choosing an inorganic oxide for use in a particular aspect of the invention. For example, when the catalyst composition is to be used in a gas-phase polymerization process—a type of process in which it is known that the polymer particle size can be varied by varying the particle size of the support—the inorganic oxide used in preparing the catalyst composition should be one having a particle size that is suitable for the production of a polymer having the desired particle size. In general, optimum results are usually obtained by the use of inorganic oxides having an average particle size in the range of about 30 to 600 microns, preferably about 30 to 100 microns; a surface area of about 50 to 1000 square meters per gram, preferably about 100 to 400 square meters per gram; and a pore volume of about 0.5 to 3.5 cc per gram, preferably about 0.5 to 2 cc per gram.

As indicated above, the organometallic compound that is reacted with the surface hydroxyl groups of the inorganic oxide in the practice of the invention may be any one or more organometallic compounds corresponding to the formula $R_xMR'_yR''_z$, wherein M is a metal of Group III of the periodic table, R is an alkyl group containing 1 to 12 carbon atoms, R' and R" are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$. Thus, M may be, e.g., aluminum, gallium, indium, or thallium; R may be, e.g., methyl, ethyl, propyl, isopropyl, n-butyl, isobutyl, n-pentyl, isopentyl, t-pentyl, hexyl, 2-methylpentyl, heptyl, octyl, 2-ethylhexyl, nonyl, decyl, dodecyl, etc.; R', when present, may be H, Cl, an alkyl group, such as one of those exemplified above for R, which is the same as or different from R, or an alkoxy group, such as the alkoxy groups corresponding to the aforementioned alkyl groups; and R", when present, may be any of the substituents mentioned above as exemplary of R' and may be the same as or different from R'.

The preferred organometallic compounds are those in which M is aluminum. Utilizable aluminum compounds include chlorides, such as dimethylaluminum chloride, diethylaluminum chloride, dipropylaluminum chloride, diisobutylalumimum chloride, the corresponding alkylaluminum dichlorides, etc., and mixtures of such chlorides, but the chlorides are generally not particularly preferred because of the halogen residue they contribute to polymers made in their presence. The more preferred aluminum compounds are the trialkylaluminums, dialkylaluminum hydrides, dialkylaluminum alkoxides, and alkylaluminum dialkoxides, such as trimethylaluminum, triethylaluminum, tripropylaluminum, tributylaluminum, triisobutylaluminum, isopropenylaluminum, trihexylaluminum, trioctylaluminum, tridecylaluminum, tridodecylaluminum, etc.; the corresponding alkoxy compounds wherein one or two of the alkyl groups have been replaced by alkoxy groups, such as ethylaluminum diethoxide, diethylaluminum ethoxide, ethylaluminum sesquiethoxide, ethylaluminum diisopropoxide, etc.; diethylaluminum hydride, di-n-propylaluminum hydride, diisobutylaluminum hydride, etc.; and mixtures of such compounds.

Especially preferred aluminum compounds are the trialkylaluminums, particularly triethylaluminum and tri-n-hexylaluminum, which are advantageous to employ because of their cost, availability, and/or effectiveness. When a trialkylaluminum is used as the organometallic compound, it is generally found that—all other factors being constant—the molecular weight distributions of polymers prepared with the catalysts of the invention are narrowed as the chain lengths of the alkyl groups of the trialkylaluminum are lengthened.

The amount of organometallic compound employed is at least substantially the stoichiometric amount, i.e., the amount required to react with all of the available hydroxyl groups on the inorganic oxide. Use of an amount less than the substantially stoichiometric amount would broaden the molecular weight distributions of polymers formed in the presence of the catalyst compositions; use of an amount greater than the substantially stoichiometric amount is permissable within the scope of the invention but frequently serves no practical purpose and can be disadvantageous in that the excess organometallic compound sometimes leads to fouling of the polymerization reactor if not removed from the catalyst composition prior to the composition's being used.

When the number of available hydroxyl groups on the particular inorganic oxide being treated is not known, it can be determined by any conventional technique, e.g., by reacting an aliquot of the inorganic oxide with excess triethylaluminum and determining the amount of evolved ethane. Once the number of available hydroxyl groups on the inorganic oxide is known, the amount of organometallic compound to be employed is chosen so as to provide at least about one mol of organometallic compound per mol of available hydroxyl groups.

The vanadium component of the catalyst compositions of the invention may be any one or more compounds corresponding to a formula selected from $(RO)_nVOX_{3-n}$ and $(RO)_mVX_{4-m}$, wherein R represents a monovalent hydrocarbon radical that contains 1 to 18 carbon atoms and is free of aliphatic unsaturation, X is Cl or Br, n has a value of 0 to 3, and m has a value of 0 to 4. Thus, the utilizable vanadium compounds include $VOCl_3$, $VOBr_3$, and the indicated mono-, di-, and trihydrocarbyloxy derivatives thereof, as well as $VCl_4$, $VBr_4$, and the indicated mono-, di-, tri-, and tetrahydrocarbyloxy derivatives thereof; and R, when present, may be a straight- or branched-chain alkyl, cycloalkyl, aryl, alkaryl, or aralkyl group, such as methyl, ethyl, propyl, isopropyl, butyl, isobutyl, pentyl, hexyl, cyclohexyl, heptyl, octyl, cyclooctyl, nonyl, decyl, dodecyl, hexadecyl, octadecyl, phenyl, benzyl, dimethylphenyl, ethylphenyl, etc. When mixtures of vanadium compounds are employed, the vanadium component may be a mixture of two or more compounds corresponding to either of the general formulas given above or a mixture of one or more compounds corresponding to one of those general formulas with one or more compounds corresponding to the other of those general formulas.

Ordinarily, when a vanadium compound of the $(RO)_nVOX_{3-n}$ type is employed, it is preferably a compound wherein X is Cl because of the greater availability of such compounds; and it is preferably a monoalkoxy compound, since (1) all other factors being constant, the use of $VOCl_3$ or $VOBr_3$ in the preparation of the catalyst compositions of the invention does not permit the attainment of as narrow a molecular weight distribution as can be obtained when the polymerization reactions of the invention are conducted in the presence of the catalyst compositions that are prepared by the use of the hydrocarbyloxy derivatives of $VOCl_3$ or $VOBr_3$ and (2) the use of hydrocarbyloxy derivatives other than the monoalkoxy compounds does not appear to offer advantages that would compensate for the greater difficulty and cost of obtaining them. Thus, considering both cost and effectiveness in the practice of the invention, the preferred $(RO)_nVOX_{3-n}$ compounds are those compounds in which R is alkyl, X is Cl, and n has a value of about 1.

Ordinarily, when a vanadium compound of the $(RO)_mVX_{4-m}$ type is employed, it is preferably $VCl_4$ or a derivative thereof, most preferably $VCl_4$ itself. The use of $VCl_4$ in the preparation of catalyst compositions of the invention leads to the formation of compositions which are so satisfactory in the production of injection molding-grade ethylene polymers that there is seldom any reason to use a more expensive $(RO)_mVX_{4-m}$ compound instead of it.

The amount of vanadium compound(s) employed in the practice of the invention may be varied considerably but is generally such as to provide at least about 0.001 mol of vanadium compound per mol of organometallic compound. When the catalyst composition is to be prepared by the preferred process described below, wherein no washing step is utilized during or after preparation of the compositions, the amount of vanadium compound employed should not be substantially in excess of the amount capable of reacting with the treated support, i.e., about 1 mol of vanadium compound per mol of organometallic compound. Use of a greater amount would serve no practical purpose and could be disadvantageous in that the excess vanadium compound could lead to fouling of the polymerization reactor. However, a larger amount of vanadium compound may be employed when fouling of the reactor is not expected to be a problem and/or excess vanadium compound will be removed from the catalyst composition before the composition is used. In the practice of the invention, the amount of vanadium compound employed is generally not in excess of about 3 mols per mol of organometallic compound; and excellent results are obtained by the use of about 0.03 to 0.2 mol of vanadium compound per mol of organometallic compound, i.e., about 5 to 30 mols of organometallic compound per mol of vanadium compound.

As indicated above, the alcohol employed in preparing the present catalyst compositions may be any alcohol containing 1 to 18 carbon atoms; and it may be conveniently defined as a compound corresponding to the formula ROH, wherein R may be any of the groups, or types of groups, mentioned above as exemplary of the R groups of the utilizable hydrocarbyloxy compounds.

When the vanadium compound, or one of the vanadium compounds, employed in the practice of the invention is a hydrocarbyloxyvanadium compound that the catalyst manufacturer will synthesize for that use, it is frequently desirable, as a matter of convenience, to employ an alcohol component identical to the alcohol required to synthesize the desired hydrocarbyloxyvanadium compound. However, it is not necessary for the R group of the alcohol to corrrespond to the R group of any hydrocarbyloxyvanadium compound being used to prepare the catalyst composition; and, in fact, correspondence of the R groups could be undesirable in some instances.

For example, if a practitioner of the invention wanted to use ethoxyvanadium oxydichloride as his vanadium compound but also wanted to prepare a catalyst composition that would provide the narrowest possible molecular weight distribution in polymers formed in its presence, it would be more desirable for him to use a long-chain alcohol, rather than ethanol, as the alcohol, because all other factors being constant, the molecular weight distribution is narrowed as the chain length of the alcohol is increased. Increasing the chain length of the hydrocarbyloxy group also tends to narrow the molecular weight distribution.

The preferred alcohols are primary alcohols, with n-alkanols containing 6 to 18 carbon atoms being particularly preferred.

The amount of alcohol used in preparing the catalyst compositions of the invention should be at least about 0.1 mol per mol of organometallic compound employed. There is no maximum amount of alcohol that may be utilized, but its beneficial effects begin decreasing when an optimum amount is exceeded, so it is generally not used in excess of 10 mols per mol of organometallic compound. Ordinarily, the amount of alcohol utilized in the practice of the invention is in the range of about 0.2 to 3, preferably about 0.3 to 1, most preferably about 0.35 to 0.7, mols per mol of organometallic compound.

As indicated above, the catalyst compositions of the invention are prepared by drying the inorganic oxide, reacting the dried inorganic oxide with the organometallic compound, reacting the thus-treated support with the vanadium compound, and then reacting that reaction product with the alcohol. The conditions under which the inorganic oxide are dried are not critical as long as they are adequate to provide an inorganic oxide that has surface hydroxyl groups and is substantially free of adsorbed water. However, it is ordinarily preferred to dry the inorganic oxide at about 100°–1000° C., with or without a nitrogen or other inert gas purge, until substantially all adsorbed water is removed. Also, although improved results are obtained by the use of the catalyst compositions of the invention, regardless of the particular temperature at which the inorganic oxide is dried, the drying temperature has been found to have a negligible-to-noticeable effect on those results—optimum results generally being obtained when the inorganic oxide has been dried at about 200°–600° C., but drying temperatures of about 500°–600° C. generally being required for optimum results when the inorganic oxide is alumina. The time required for drying of the inorganic oxide varies, of course, with the particular drying temperature used but is usually in the range of about 5–16 hours.

When the inorganic oxide has been substantially freed of adsorbed water, its surface hydroxyl groups may be reacted with the organometallic compound in any suitable manner, conveniently by (1) adjusting its temperature, if necessary, to the temperature at which the reaction with the organometallic compound is to be conducted, (2) slurrying it in an inert liquid hydrocarbon, generally a $C_4$–$C_8$ hydrocarbon, such as isobutane, pentane, isopentane, hexane, cyclohexane, heptane, isooctane, etc., and mixtures thereof with one another and/or with other materials commonly present in commercial distillation cuts having the desired boiling range, (3) adding a substantially stoichiometric amount of the organometallic compound in neat or solution form, and (4) maintaining the organometallic compound in intimate contact with the inorganic oxide, e.g., by agitating the slurry, for a time sufficient to ensure substantially complete reaction with the available hydroxyl groups, generally at least about 5 minutes. The reaction may be conducted with or without pressure and at ambient or reflux temperatures, depending on the particular organometallic compound employed, as will be readily understood by those skilled in the art. When the organometallic compound is added in solution form, it is generally preferred, though not required, that the solvent be the same inert liquid hydrocarbon as is already present in the slurry.

The reaction of the vanadium component with the treated support may also be accomplished by conventional means, such as any of the techniques described in British Pat. No. 1,489,410, the teachings of which are incorporated herein by reference. However, it is most desirably accomplished simply by adding the vanadium compound in neat or solution form to the slurry of treated support and maintaining it in intimate contact with the treated support for a time sufficient to provide for substantially complete reaction, usually at least about 5 minutes and preferably about 10–60 minutes, although, actually, the reaction is virtually instantaneous.

When reaction of the vanadium component with the treated support has been completed, reaction with the alcohol may be accomplished in any suitable manner, conveniently just by adding the alcohol to the vanadium component/treated support reaction product and maintaining it in contact therewith, e.g., by agitating the slurry, for a time sufficient to ensure substantial completion of the desired reaction, usually at least about 5 minutes and most commonly about 30–60 minutes. All that is critical about the manner in which the alcohol is reacted with the other catalyst components is the time at which it is added to the system. Reaction of the other components with one another must be substantially complete before the alcohol is added in order for the catalyst compositions to have the desired performance capabilities.

After the alcohol has been reacted with the other catalyst components, the resultant catalyst composition may or may not require further treatment to make it suitable for use, depending on the particular process that has been used to prepare the catalyst composition and the particular type of polymerization process in which it is to be used. For example, if the catalyst composition has been prepared by a type of process which results in its being already dry when reaction with the alcohol has been accomplished, no further treatment is likely to be necessary if the composition is to be used in a gas-phase polymerization process; but slurrying of the composition in a suitable liquid medium may be desirable if it is to be used in a slurry or solution polymerization process. On the other hand, if the catalyst composition has been prepared by the preferred process described above, i.e., if the inorganic oxide has been slurried in a liquid medium prior to the addition of the other components, it is already suitable for use in a slurry or solution polymerization process but will have to be dried to make it suitable for use in a gas-phase polymerization process. When the composition is to be dried, i.e., freed of any liquid medium used in its preparation, the drying may be achieved by any conventional technique, e.g., filtration, centrifugation, evaporation, blowing with nitrogen, etc.

Regardless of the particular technique used to prepare the catalyst compositions of the invention, it should be kept in mind that they are Ziegler catalysts and are therefore susceptible to poisoning by the materials, such as oxygen, water, etc., that are known to reduce or destroy the effectiveness of Ziegler catalysts. Accordingly, they should be prepared, stored, and used under conditions that will permit them to be useful as polymerization catalysts, e.g., by the use of an inert gas atmosphere, such as nitrogen.

Use of the catalyst compositions of the invention does not require any modifications of known techniques for the polymerization of ethylene, with or without comonomers. Thus, the polymerization may be conducted by a solution, slurry, or gas-phase technique, generally at a temperature in the range of about 0°-120° C. or even higher, and under atmospheric, subatmospheric, or superatmospheric pressure conditions; and conventional polymerization adjuvants, such as hydrogen, haloalkanes, etc., and conventional catalyst concentrations, e.g., about 0.01-5% by weight of monomer, may be employed if desired. However, it is generally preferred to use the catalyst compositions at a concentration such as to provide about 0.000001-0.005%, most preferably about 0.00001-0.0003%, by weight of vanadium, based on the weight of monomer(s), in the polymerization of ethylene, alone or with up to about 50%, based on the weight of total monomer, of one or more higher alpha-olefins, in a gas-phase polymerization process utilizing superatmospheric pressures, temperatures in the range of about 65°-115° C., and hydrogen and haloalkane adjuvants.

Comonomers, when employed, are generally alpha-olefins containing 3-12 carbon atoms, e.g., propylene, butene-1, pentene-1, 4-methylpentene-1, hexene-1, heptene-1, octene-1, nonene-1, decene-1, dodecene-1, etc., and mixtures thereof.

The invention is particularly advantageous in that it provides catalyst compositions which (1) have the active ingredients chemically-attached to an inorganic oxide support, (2) are capable of producing ethylene polymers having a narrow-to-intermediate molecular weight distribution, as desired, and a good balance of physical properties by an economical gas-phase process that gives a high yield of polymer and (3) can also be used to prepare such polymers by slurry or solution processes. The fact that high yields of polymer can be obtained by the use of the catalyst compositions is particularly unexpected in that these high yields are attainable even when the catalyst compositions are prepared by the preferred process wherein no washing step is required or utilized during or after preparation of the compositions. Both experience in the field and the teachings of the prior art indicate that at least one washing step should be required in the preparation of such compositions when high yield catalysts are desired.

The following examples are given to illustrate the invention and are not intended as a limitation thereof. In these examples, compositions and processes that are illustrative of the invention are disinguished from those that are outside the scope of the invention and are included only for comparative purposes by using an alphabetic designation for any Run # that is a comparative example and a numeric designation for the examples that are illustrative of the invention. Yields given in the examples are measures of productivity in terms of the number of grams of polymer produced per 0.4 gram of catalyst per hour, melt indices ($MI_2$) are those determined by ASTM test D-1238-65T using a 2160-gram weight, while the NVR values are "normalized" melt viscosity ratios determined by (1) measuring the apparent viscosities of the polymers at 30 sec$^{-1}$ and 300 sec.$^{-1}$, respectively, at 200° C. in an Instron capillary rheometer and (2) normalizing them to $V_{30}=5$ by the equation:

$$NVR = antilog\ (0.14699 + 0.7897\ log\ V_{30} - log\ V_{300})$$

where $V_{30}$ and $V_{300}$ are the measured apparent viscosities. This normalization permits comparison of the viscosity ratios of polymers having different $V_{30}$ values, since the unnormalized $V_{30}/V_{300}$ ratio is a function of $V_{30}$. The NVR is constant for any given catalyst over an $MI_2$ range of about 1-30, and only slight deviations occur outside of that range.

In the examples, the following procedures are used to prepare the catalyst compositions and polymers.

PREPARATION OF CATALYSTS

In the preparation of each of the catalysts, dry a commercial inorganic oxide by heating it under dry, deoxygenated nitrogen for 5-16 hours at a temperature of 200°-600° C. to provide an activated oxide containing about 1-1.4 mmols of available hydroxyl groups per gram. Cool the activated oxide to ambient temperature under a purified nitrogen blanket, suspend it in commercial hexane, add neat organometallic compound, and stir the resultant slurry for 30-60 minutes. Then add a vanadium compound in neat or solution form, stir the resultant slurry for an additional 30-60 minutes, add an alcohol, stir for another 30-60 minutes, and remove the hexane under a nitrogen purge to produce a powdered solid catalyst. The particular ingredients used to prepare the catalysts, the amounts of organometallic, vanadium, and alcohol compounds added per gram of inorganic oxide, and the particular temperatures used to dry the inorganic oxides are shown in the examples and/or tables.

Throughout the examples the commercial magnesium oxide used is Merck Maglite D, an inorganic oxide having a surface area of about 150-200 square meters per gram, a pore volume of about 1.2-1.5 cc per gram, and an average particle size of about 30-40 microns; the commercial silica employed is Davison 952 silica gel, an inorganic oxide having a surface area of about 250-350 square meters per gram, a pore volume of about 1.5-1.7 cc per gram, and an average particle size of about 65-75 microns; the commercial alumina is Norton 6376, an inorganic oxide having a surface area of more than 100 square meters per gram and a pore volume of about 0.8-1.1 cc per gram; and the commercial aluminum silicate and magnesium silicate are W. R. Grace's materials having the designations XSZ-AL-65C and XSZ-MG-66C, respectively.

SLURRY POLYMERIZATION

Charge 1.5 liters of dry hexane to a suitable autoclave under a dry, deoxygenated nitrogen atmosphere, add 2.1 mmols of triethylaluminum as an activator-scavenger, stir for 5 minutes, and add a slurry of 0.1-0.4 gram of catalyst powder in, respectively, 1-4 ml of commercial hexane. Raise the temperature of the reactor to 85°-90° C., add enough hydrogen to ensure the production of a polymer having a molecular weight such that its $MI_2$ will be within the range of about 1-30, raise the reactor pressure to about 2.1 MPa with ethylene and any comonomer(s) being employed, and hold the pressure at that level throughout the polymerization by adding monomer as needed. Immediately after pressurizing the reactor with monomer, add 0.17 mmol of chloroform as a promoter; and, at 15-minute intervals thereafter, add supplemental 0.17 mmol aliquots of the promoter. After one hour, stop the polymerization by venting the autoclave, opening the reactor, and filtering the polymer from the liquid medium. Then dry the polymer under vacuum at 60° C. for 4 hours.

GAS-PHASE POLYMERIZATION

Charge the catalyst powder to a vertical cylindrical reactor adapted to contain a fluidized bed of catalyst and product particles and to permit the separation and return of entrained particles in unreacted gas by the use of a disengaging zone of larger diameter at the top of the bed.

Introduce a stream or streams of ethylene, any comonomer(s), chloroform, and hydrogen to the reactor. Continuously withdraw unreacted or recycle gas from the top of the disengaging zone, pass it through a heat exchanger to maintain a bed temperature of about 95°–100° C., and introduce it at the bottom of the reactor at a rate sufficient to give a superficial velocity of about 25 cm/sec in the bed.

Introduce make-up monomer, chloroform, and hydrogen into the recycle gas line so as to maintain the reactor pressure at about 3.5 MPa and to provide about 40 mmols of chloroform per mmol of vanadium per hour, and feed fresh catalyst particles into the reactor below the top of the bed so as to provide a vanadium feed rate of one mmol per hour. Add triethylaluminum as a scavenger and supplemental activator during the polymerization so as to provide a triethylaluminum feed rate of 20 mmol per hour. Withdraw polymer product semi-continuously from the bottom of the bed at a rate such as to maintain a constant bed level. Take aliquots of withdrawn polymer for testing.

EXAMPLE I

Prepare five catalyst compositions by the catalyst preparation procedure described above, except for using no alcohol in the preparation of the first composition. In each case, employ MgO as the inorganic oxide, triethylaluminum as the organometallic compound, ethoxyvanadium oxydichloride as the vanadium compound, and ethanol as the alcohol, when employed; and dry the support at about 200° C. Use each of the catalyst compositions to prepare polyethylene by the slurry polymerization procedure described above. The amounts of ingredients employed in the production of the catalyst compositions, and the yields, melt indices, and normalized viscosity ratios (NVR), i.e., molecular weight distributions, of the polymers are shown in Table I.

TABLE I

| Run # | Catalyst Composition | | | Yield | MI$_2$ | NVR |
|---|---|---|---|---|---|---|
| A | (C$_2$H$_5$O)VOCl$_2$/Al(C$_2$H$_5$)$_3$/MgO | | | 70 g | 1.0 | 2.29 |
|  | 0.2 mmol | 1.0 mmol | 1 g |  |  |  |
| 1 | C$_2$H$_5$OH/(C$_2$H$_5$O)VOCl$_2$/Al(C$_2$H$_5$)$_3$/MgO | | | 104 g | 4.6 | 2.25 |
|  | 0.2 mmol 0.2 mmol | 1.0 mmol | 1 g |  |  |  |
| 2 | C$_2$H$_5$OH/(C$_2$H$_5$O)VOCl$_2$/Al(C$_2$H$_5$)$_3$/MgO | | | 85 g | 2.5 | 2.14 |
|  | 0.5 mmol 0.2 mmol | 1.0 mmol | 1 g |  |  |  |
| 3 | C$_2$H$_5$OH/(C$_2$H$_5$O)VOCl$_2$/Al(C$_2$H$_5$)$_3$/MgO | | | 30 g | 4.1 | 2.10 |
|  | 1.0 mmol 0.2 mmol | 1.4 mmol | 1 g |  |  |  |
| 4 | C$_2$H$_5$OH/(C$_2$H$_5$O)VOCl$_2$/Al(C$_2$H$_5$)$_3$/MgO | | | 138 g | 4.2 | 2.06 |
|  | 1.4 mmol 0.1 mmol | 1.4 mmol | 1 g |  |  |  |

As demonstrated above, the addition of ethanol, as the last-added component, with an ethoxyvanadium oxydichloride/triethylaluminum/magnesium oxide catalyst composition results in the formation of a catalyst composition that narrows the molecular weight distribution of polymers formed in its presence—this narrowing of the molecular weight distribution being progressive as the amount of ethanol used is increased from 0.2 to 1.0 per mol of triethylaluminum. The following example shows that polymers having narrow molecular weight distributions can also be obtained when an alkylaluminum alkoxide is substituted for a trialkylaluminum in the practice of the invention.

EXAMPLE II

Prepare a catalyst composition by the catalyst preparation procedure described above, using MgO as the inorganic oxide, drying it at about 200° C., and sequentially reacting with 1.0 mmol of diethylaluminum ethoxide, 0.2 mmol of ethoxyvanadium oxydichloride, and 1.0 mmol of ethanol per gram of silica. When the catalyst composition is used to prepare polyethylene by the slurry polymerization procedure described above, the process results in the production of 80 grams of polymer having a melt index of 3.0 and an NVR value of 2.12.

EXAMPLE III

Prepare two CH$_3$OH/(n-C$_{18}$H$_{37}$O)VOCl$_2$/Al(C$_2$H$_5$)$_3$/SiO$_2$ catalyst compositions by the catalyst preparation procedure described above, employing the same amounts of ingredients in each case, i.e., 1.5 mmol of triethylaluminum, 0.2 mmol of n-octadecoxyvanadium oxydichloride, and 1.0 mmol of methanol per gram of silica, but using a drying temperature of about 200° C. for the silica used in producing the first of the compositions and a drying temperature of about 550° C. for the silica used in producing the second of the compositions. Then use each of the catalyst compositions to prepare polyethylene by the slurry polymerization procedure described above. The yields, melt indices, and NVR values of the polymers are shown in Table II.

TABLE II

| Run # | Support Drying Temp. | Yield | MI$_2$ | NVR |
|---|---|---|---|---|
| 5 | 200° C. | 170 g | 5.4 | 2.34 |
| 6 | 550° C. | 198 g | 4.6 | 1.99 |

The preceding example and the following three examples show that the use of different inorganic oxides, different alkoxyvanadium compounds, and different alcohols which may or may not have the same chain length as the alkoxy groups of the vanadium compounds employed, as well as the use of different support drying temperatures, are permissable within the scope of the invention and lead to the formation of catalyst compositions that can be used to prepare polymers having narrow-to-intermediate molecular weight distributions. These examples also show that, in general, narrower molecular weight distributions are obtained when the catalysts used in the preparation of ethylene polymers are formed by the use of supports that have been dried at the higher temperatures within the preferred range of drying temperatures taught in the specification.

EXAMPLE IV

Prepare three n-$C_8H_{17}$OH/(n-$C_8H_{17}$O)VOCl$_2$/Al($C_2H_5$)$_3$/SiO$_2$ catalyst compositions by the catalyst preparation procedure described above, employing the same amounts of ingredients in each case, i.e., 1.4 mmol of triethylaluminum, 0.2 mmol of n-octoxyvanadium oxydichloride, and 1.0 mmol of n-octanol per gram of silica, but using different drying temperatures for the silica used in producing each of the compositions, i.e., 200° C., 350° C., and 550° C., respectively. Then use each of the catalyst compositions to prepare polyethylene by the slurry polymerization procedure described above. The yields, melt indices, and NVR values of the polymers are shown in Table III.

TABLE III

| Run # | Support Drying Temp. | Yield | MI$_2$ | NVR |
|---|---|---|---|---|
| 7 | 200° C. | 55 g | 1.8 | 2.32 |
| 8 | 350° C. | 146 g | 2.1 | 2.41 |
| 9 | 550° C. | 320 g | 20.2 | 1.95 |

EXAMPLE V

Prepare two n-$C_8H_{17}$OH/(n-$C_8H_{17}$O)VOCl$_2$/Al($C_2H_5$)$_3$/Al$_2$O$_3$ catalyst compositions by the catalyst preparation procedure described above, employing the same amounts of ingredients in each case, i.e., 1.4 mmol of triethylaluminum, 0.2 mmol of n-octoxyvanadium oxydichloride, and 1.0 mmol of n-octanol per gram of alumina, but using a drying temperature of about 200° C. for the alumina used in producing the first of the compositions and a drying temperature of about 550° C. for the alumina used in producing the second of the compositions. Then use each of the catalyst compositions to prepare polyethylene by the slurry polymerization procedure described above. The yields, melt indices, and NVR values of the polymers are shown in Table IV.

TABLE IV

| Run # | Support Drying Temp. | Yield | MI$_2$ | NVR |
|---|---|---|---|---|
| 10 | 200° C. | 47 g | 6.9 | 2.16 |
| 11 | 550° C. | 83 g | 11.6 | 1.65 |

EXAMPLE VI

Prepare two n-$C_8H_{17}$OH/(n-$C_8H_{17}$O)VOCl$_2$/Al($C_6H_{13}$)$_3$/Al$_2$O$_3$ catalyst compositions by the catalyst preparation procedure described above, employing the same amounts of ingredients in each case, i.e, 1.5 mmol of tri-n-hexylaluminum, 0.2 mmol of n-octoxyvanadium oxydichloride, and 1.0 mmol of n-octanol per gram of alumina, but using a drying temperature of about 200° C. for the alumina used in producing the first of the compositions and a drying temperature of about 500° C. for the alumina used in producing the second of the compositions. Then use each of the catalyst compositions to prepare polyethylene by the slurry polymerization procedure described above. The yields, melt indices, and NVR values of the polymers are shown in Table V.

TABLE V

| Run # | Support Drying Temp. | Yield | MI$_2$ | NVR |
|---|---|---|---|---|
| 12 | 200° C. | 48 g | — | 1.91 |
| 13 | 500° C. | 355 g | 18.6 | 1.67 |

As demonstrated above, particularly when #12 of this example is compared with Run #10 of the preceding example, the substitution of a higher trialkylaluminum for a lower trialkylaluminum in preparing the catalyst compositions of the invention can lead to a narrowing of the molecular weight distribution of polymers formed in the presence of the catalyst compositions when all other factors are substantially constant.

EXAMPLE VII

Prepare three n-$C_8H_{17}$OH/(n-$C_8H_{17}$O)VOCl$_2$/Al($C_6H_{13}$)$_3$/inorganic oxide catalyst compositions by the catalyst preparation procedure described above, employing the same amounts of ingredients in each case, i.e., 1.4 mmol of tri-n-hexylaluminum, 0.1 mmol of n-octoxyvanadium oxydichloride, and 0.25 mmol of n-octanol per gram of inorganic oxide, and drying the support at about 250° C. in each case, but using different inorganic oxides as the supports, i.e., silica, magnesium silicate, and aluminum silicate, respectively. Then use each of the catalyst compositions to prepare polyethylene by the slurry polymerization procedure described above. The melt indices and NVR values of the polymers are shown in Table VI.

TABLE VI

| Run # | Inorganic Oxide Support | MI$_2$ | NVR |
|---|---|---|---|
| 14 | silica | 11.9 | 1.97 |
| 15 | magnesium silicate | 8.7 | 1.76 |
| 16 | aluminum silicate | 11.9 | 1.66 |

This example shows that mixtures of inorganic oxides are also useful as supports for the catalyst compositions of the invention and can, in fact, be particularly desirable supports.

The following two examples demonstrate that the reaction of the inorganic oxide with substantially less than a stoichiometric amount of the organometallic compound leads to the formation of polymers having broader molecular weight distributions when the catalyst compositions are used in polymerization reactions, and reaction with an amount of organometallic compound considerably in excess of the stoichiometric amount—although also useful in the preparation of catalyst compositions capable of being utilized in the production of injection molding-grade polymers—offers no NVR advantage over the use of a substantially stoichiometric amount of the organometallic compound.

EXAMPLE VIII

Prepare three n-$C_6H_{13}$OH/(n-$C_{18}H_{37}$O)VOCl$_2$/Al($C_6H_{13}$)$_3$)$_3$/SiO$_2$ catalyst compositions by the catalyst preparation procedure described above, drying the silica gel at about 200° C. in each case and employing the same amounts of alcohol and vanadium compound, i.e., 1.0 mmol of n-hexanol and 0.2 mmol of n-octadecoxyvanadium oxydichloride per gram of silica, but varying the amount of tri-n-hexylaluminum used. Then use each of the catalyst compositions to prepare polyethylene by the slurry polymerization procedure described above. The yields, melt indices, and NVR values of the polymers are shown in Table VII.

TABLE VII

| Run # | mmol AlR$_3$/g SiO$_2$ | Yield | MI$_2$ | NVR |
|---|---|---|---|---|
| B | 0.8 | 45 g | 1.0 | 2.54 |
| 17 | 1.5 | 74 g | 8.3 | 1.76 |

TABLE VII-continued

| Run # | mmol AIR$_3$/g SiO$_2$ | Yield | MI$_2$ | NVR |
|---|---|---|---|---|
| 18 | 2.25 | 250 g | — | 1.78 |

EXAMPLE IX

Prepare three n-C$_8$H$_{17}$OH/(n-C$_8$H$_{17}$O)VOCl$_2$/Al(C$_2$H$_5$)$_3$/SiO$_2$ catalyst compositions by the catalyst preparation procedure described above, driving the silica gel at about 550° C. in each case and employing the same amounts of alcohol and vanadium compound, i.e., 1.0 mmol of n-octanol and 0.2 mmol of n-octoxyvanadium oxydichloride per gram of silica, but varying the amount of triethylaluminum used. Then use each of the catalyst compositions to prepare polyethylene by the slurry polymerization procedure described above. The yields, melt indices, and NVR values of the polymers are shown in Table VIII.

TABLE VIII

| Run # | mmol AIR$_3$/g SiO$_2$ | Yield | MI$_2$ | NVR |
|---|---|---|---|---|
| C | 0.8 | 48 g | 4.5 | 2.58 |
| D | 0.8 | 55 g | 1.4 | 2.78 |
| 19 | 1.5 | 320 g | 20.2 | 1.95 |

EXAMPLE X

Prepare two catalyst compositions by the catalyst preparation procedure described above to test the utility of dialkoxyvanadium compounds in the practice of the invention. Use each of the compositions to prepare polyethylene by the slurry polymerization procedure described above. The yields, melt indices, and NVR values of the polymers obtained by the use of each of the catalyst compositions are shown in Table IX.

TABLE IX

| Run # | Catalyst Composition | Yield | MI$_2$ | NVR |
|---|---|---|---|---|
| 20 | C$_2$H$_5$OH/(C$_2$H$_5$O)$_2$VOCl/Al(C$_2$H$_5$)$_3$/MgO<br>1.0 mmol 0.2 mmol  1.0 mmol  1 g | 152 g | 31 | 2.07 |
| 21 | C$_6$H$_{13}$OH/(C$_{18}$H$_{37}$O)$_2$VOCl/Al(C$_6$H$_{13}$)$_3$/SiO$_2$<br>1.0 mmol 0.1 mmol  1.5 mmol  1 g | 281 g | 4.7 | 1.76 |

EXAMPLE XI

Prepare a catalyst composition by the catalyst preparation procedure described above, using silica gel as the inorganic oxide, drying it at about 200° C., and sequentially reacting with 1.5 mmol of tri-n-hexylaluminum, 0.1 mmol of vanadium oxytrichloride, and 1.0 mmol of n-hexanol per gram of silica. When the catalyst composition is used to prepare polyethylene by the slurry polymerization procedure described above, the process results in the production of 196 grams of polymer having a melt index of 12.5 and an NVR value of 1.86.

EXAMPLE XIII

Prepare three catalyst compositions by the catalyst preparation procedure described above, except for using no alcohol in the preparation of the first composition. In each case, employ SiO$_2$ as the inorganic oxide, triethylaluminum as the organometallic compound, vanadium tetrachloride as the vanadium compound, and n-hexanol as the alcohol, when employed; and dry the support at about 250° C. Use each of the catalyst compositions to prepare polyethylene by the slurry polymerization procedure described above. The number of mmols of triethylaluminum, vanadium tetrachloride, and n-hexanol employed per gram of silica in the production of the catalyst compositions, and the yields, melt indices, and NVR values of the polymers are shown in Table X.

TABLE X

| Run # | Catalyst Composition | Yield | MI$_2$ | NVR |
|---|---|---|---|---|
| E | VCl$_4$/Al(C$_2$H$_5$)$_3$/SiO$_2$<br>0.2  1.5 | 2366 g | 0.3 | 2.34 |
| 22 | C$_6$H$_{13}$OH/VCl$_4$/Al(C$_2$H$_5$)$_3$/SiO$_2$<br>0.15  0.05  1.4 | 227 g | 1.7 | 2.17 |
| 23 | C$_6$H$_{13}$OH/VCl$_4$/Al(C$_2$H$_5$)$_3$/SiO$_2$<br>0.5  0.2  1.5 | 1007 g | 0.4 | 2.01 |

Examples X–XIII demonstrate the utility of vanadium compounds other than alkoxyvanadium oxydichlorides in the practice of the invention.

EXAMPLE XIV

Prepare a C$_6$H$_{13}$OH/(C$_{18}$H$_{37}$O)VOCl$_2$/Al(C$_6$H$_{13}$)$_3$/SiO$_2$ catalyst composition by the catalyst preparation procedure described above, employing 1.5 mmol of tri-n-hexylaluminum, 0.1 mmol of n-octadecoxyvanadium oxydichloride, and 1.0 mmol of n-hexanol per gram of silica. For comparative purposes, prepare five other catalyst compositions from the same amounts of the same ingredients, and use the same drying temperature for the silica as was used in the preparation of the first of the compositions, but vary the order of addition of the catalyst components to determine the criticality of that order of addition. Then use each of the catalyst compositions to prepare polyethylene by the slurry polymerization procedure described above. The catalyst compositions and the melt indices and NVR values of the polymers are shown in Table XI, which, like the earlier Tables, lists the catalyst components in the reverse order of addition, i.e., the last-added component being the first listed as one reads from left to right.

TABLE XI

| Run # | Catalyst Composition | MI$_2$ | NVR |
|---|---|---|---|
| 24 | C$_6$H$_{13}$OH/(C$_{18}$H$_{37}$O)VOCl$_2$/Al(C$_6$H$_{13}$)$_3$/SiO$_2$ | 9.1 | 1.69 |
| F | Al(C$_6$H$_{13}$)$_3$/C$_6$H$_{13}$OH/(C$_{18}$H$_{37}$O)VOCl$_2$/SiO$_2$ | — | 2.51 |
| G | C$_6$H$_{13}$OH/Al(C$_6$H$_{13}$)$_3$/(C$_{18}$H$_{37}$O)VOCl$_2$/SiO$_2$ | — | 2.81 |
| H | (C$_{18}$H$_{37}$O)VOCl$_2$/C$_6$H$_{13}$OH/Al(C$_6$H$_{13}$)$_3$/SiO$_2$ | 0.4 | 2.44 |
| I | (C$_{18}$H$_{37}$O)VOCl$_2$/Al(C$_6$H$_{13}$)$_3$/C$_6$H$_{13}$OH/SiO$_2$ | 0.2 | 2.88 |
| J | Al(C$_6$H$_{13}$)$_3$/(C$_{18}$H$_{37}$O)VOCl$_2$/C$_6$H$_{13}$OH/SiO$_2$ | 1.5 | 2.38 |

As demonstrated above, catalyst compositions prepared from the same components as the catalyst compositions of the invention do not have the same effectiveness in narrowing the molecular weight distributions of polymers prepared in their presence when the catalyst components are combined in a different order.

Each of the preceding examples illustrates the utility of catalyst compositions of the invention in slurry polymerization processes. The following two examples demonstrate their utility in gas-phase polymerization reactions.

ydichloride, and 1.0 mmol of an alkanol per gram of magnesia. Then use each of the catalyst compositions to prepare an ethylene copolymer by the slurry polymerization procedure described above, employing 30 cc of liquid butene-1 as the comonomer in each case. The catalyst compositions and the melt indices, NVR values, and densities of the polymers are shown in Table XIV.

TABLE XIV

| Run # | Catalyst Composition | $MI_2$ | NVR | Density |
|---|---|---|---|---|
| 32 | $C_2H_5OH/(C_2H_5O)VOCl_2/Al(C_2H_5)_3/MgO$ | 20 | 2.00 | 0.960 |
| 33 | $C_4H_9OH/(C_4H_9O)VOCl_2/Al(C_2H_5)_3/MgO$ | 1.4 | 1.95 | 0.956 |

EXAMPLE XV

Use the catalyst composition of Example I, Run #3, to prepare polyethylene by the gas-phase polymerization procedure described above. The reaction temperature employed for the polymerizations and the melt indices and NVR values of the product are shown in Table XII.

TABLE XII

| Run # | Temperature | $MI_2$ | NVR |
|---|---|---|---|
| 25 | 99° C. | 40 | 2.08 |
| 26 | 99° C. | 7 | 2.02 |
| 27 | 88° C. | 6 | 2.14 |
| 28 | 88° C. | 3 | 2.16 |

EXAMPLE XVI

Use the catalyst composition of Example VIII, Run #17, to prepare polyethylene by the gas-phase polymerization procedure described above. The melt indices and NVR values of the products are shown in Table XIII.

TABLE XIII

| Run # | $MI_2$ | NVR |
|---|---|---|
| 29 | 10.8 | 1.89 |
| 30 | 24.1 | 1.88 |
| 31 | 7.7 | 1.85 |

The foregoing examples illustrate the utility of the invention in the preparation of high density polyethylenes which typically have densities of at least 0.965 g/cc. The following examples illustrate its utility in the preparation of ethylene polymers having lower densities.

EXAMPLE XVII

Prepare two catalyst compositions by the catalyst preparation procedure described above, using magnesia as the inorganic oxide in each case, drying it at about 200° C., and sequentially reacting it with 1.4 mmol of triethylaluminum, 0.2 mmol of an alkoxyvanadium ox-

EXAMPLE XVIII

Prepare two catalyst compositions by the catalyst preparation procedure described above, using silica as the inorganic oxide in each case, drying it at about 550° C., and sequentially reacting it with 1.4 mmol of triethylaluminum, 0.2 mmol of an alkoxyvanadium oxydichloride, and 1.0 mmol of an alkanol per gram of silica. Then use each of the catalyst compositions to prepare an ethylene copolymer by the slurry polymerization procedure described above, employing 40 cc of liquid butene-1 as the comonomer in each case. The catalyst compositions and the melt indices, NVR values, and densities of the polymers are shown in Table XV.

TABLE XV

| Run # | Catalyst Composition | $MI_2$ | NVR | Density |
|---|---|---|---|---|
| 34 | $C_8H_{17}OH/(C_8H_{17}O)VOCl_2/Al(C_2H_5)_3/SiO_2$ | 52.6 | 2.05 | 0.948 |
| 35 | $CH_3OH/(C_{18}H_{37}O)VOCl_2/Al(C_2H_5)_3/SiO_2$ | 17.3 | 1.85 | 0.952 |

EXAMPLE XIX

Prepare two catalyst compositions by the catalyst preparation procedure described above, using alumina as the inorganic oxide in each case, drying it at about 550° C. in the case of the catalyst composition to be used in Run #36 and at about 500° C. in the case of the catalyst composition to be used in Run #37, and sequentially reacting it with 1.5 mmol of a trialkylaluminum, 0.2 mmol of n-octoxyvanadium oxydichloride, and 1.0 mmol of n-octanol per gram of alumina. Then use each of the catalyst compositions to prepare an ethylene copolymer by the slurry polymerization procedure described above, employing 40 cc of liquid butene-1 as the comonomer in each case. The catalyst compositions and the melt indices, NVR values, and densities of the polymers are shown in Table XVI.

TABLE XVI

| Run # | Catalyst Composition | $MI_2$ | NVR | Density |
|---|---|---|---|---|
| 36 | $C_8H_{17}OH/(C_8H_{17}O)VOCl_2/Al(C_2H_5)_3/Al_2O_3$ | 16.3 | 1.75 | 0.955 |
| 37 | $C_8H_{17}OH/(C_8H_{17}O)VOCl_2/Al(C_6H_{13})_3/Al_2O_3$ | 67.8 | 1.63 | 0.955 |

EXAMPLE XX

Use the catalyst composition of Example XIII, Run #23, to prepare an ethylene copolymer by the slurry polymerization procedure described above, employing 100 cc of liquid butene-1 as the comonomer. The process results in the production of 1007 grams of an ethylene/butene-1 copolymer having an NVR value of 2.01 and a density of 0.937.

EXAMPLE XXI

Use the catalyst of Example XI to prepare an ethylene copolymer by the slurry polymerization procedure described above, utilizing 40 cc of liquid butene-1 as the comonomer. The process results in the production of 283 grams of an ethylene/butene-1 copolymer having an $MI_2$ of 11.4 and an NVR value of 2.17.

Similar results in the narrowing of the molecular weight distributions of ethylene polymers ae obtained when the examples are repeated except that the catalyst components, component proportions, comonomers, comonomer proportions, and/or polymerization conditions specified in the examples are replaced with catalyst components, component proportions, comonomers, comonomer proportions, and/or polymerization conditions taught to be their equivalents in the specification.

What is claimed is:

1. A catalyst composition consisting essentially of the product obtained by:
   (1) drying an inorganic oxide having surface hydroxyl groups to form a support that is substantially free of adsorbed water,
   (2) reacting the surface hydroxyl groups of the support with at least a substantially stoichiometric amount of at least one organometallic compound corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$,
   (3) reacting the thus-treated support with at least about 0.001 mol, per mol of organometallic compound, of at least one vanadium compound corresponding to a formula selected from $(RO)_n\text{-}VOX_{3-n}$ and $(RO)_mVX_{4-m}$, in which formulas R represents a $C_1$-$C_{18}$ monovalent hydrocarbon radical that is free of aliphatic unsaturation, X is Cl or Br, n has a value of 0 to 3, and m has a value of 0 to 4, and
   (4) reacting the product of step 3 with at least about 0.1 mol, per mol of organometallic compound, of an alcohol containing 1 to 18 carbon atoms.

2. The composition of claim 1 wherein the support is an inorganic oxide selected from the group consisting of silica, alumina, magnesia, and mixtures thereof.

3. The composition of claim 1 wherein the organometallic compound is a compound corresponding to the formula RAlR'R'', wherein at least one of the R, R', and R'' substituents is an alkyl group containing 1 to 12 carbon atoms and the remaining substituents are independently selected from the group consisting of hydrogen and alkyl and alkoxy groups containing 1 to 12 carbon atoms.

4. The compositions of claim 3 wherein the organometallic compound is a trialkylaluminum.

5. The composition of claim 4 wherein the trialkylaluminum is triethylaluminum.

6. The composition of claim 4 wherein the trialkylaluminum is tri-n-hexylaluminum.

7. The composition of claim 1 wherein the vanadium compound is a compound corresponding to the formula $(RO)_nVOCl_{3-n}$.

8. The composition of claim 7 wherein R is alkyl and n has a value of about 1.

9. The composition of claim 7 wherein n has a value of 0.

10. The composition of claim 1 wherein the vanadium compound is a compound corresponding to the formula $(RO)_mVCl_{4-m}$.

11. The composition of claim 10 wherein m has a value of 0.

12. The composition of claim 1 wherein the alcohol is a primary alcohol.

13. The composition of claim 12 wherein the alcohol is an alkanol containing at least 6 carbon atoms.

14. The composition of claim 1 wherein the amounts of materials employed in its preparation are such as to provide, as starting materials, about 5 to 30 mols of organometallic compound per mol of vanadium compound.

15. The composition of claim 1 wherein the amount of organometallic compound reacted with the surface hydroxyl groups of the support is the substantially stoichiometric amount.

16. A process for preparing the catalyst composition of claim 1 which consists essentially of (1) drying the inorganic oxide to remove substantially all adsorbed water, (2) slurrying the dried inorganic oxide in an inert liquid hydrocarbon, (3) adding at least a substantially stoichiometric amount of the organometallic compound to react it with the surface hydroxyl groups of the inorganic oxide, (4) adding the vanadium compound to react it with the treated inorganic oxide, (5) subsequently adding an alcohol containing 1 to 18 carbon atoms, and (6) drying the composition thus formed.

17. The process of claim 16 wherein the inorganic oxide is dried at about 100° to 1000° C. until substantially all adsorbed water is removed and is then cooled to ambient temperature before being slurried.

18. The process of claim 17 wherein the inorganic oxide is silica and the drying temperature is about 200° to 600° C.

19. The process of claim 17 wherein the inorganic oxide is magnesia and the drying temperature is about 200° to 600° C.

20. The process of claim 17 wherein the inorganic oxide is alumina and the drying temperature is about 500° to 600° C.

21. The process of claim 16 wherein the organometallic and vanadium compounds are added to the reaction mixture in neat form.

22. The process of claim 16 wherein at least one of the organometallic and vanadium compounds is added to the reaction mixture in the form of an inert liquid hydrocarbon solution.

* * * * *